UNITED STATES PATENT OFFICE.

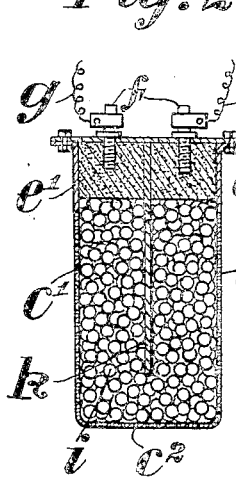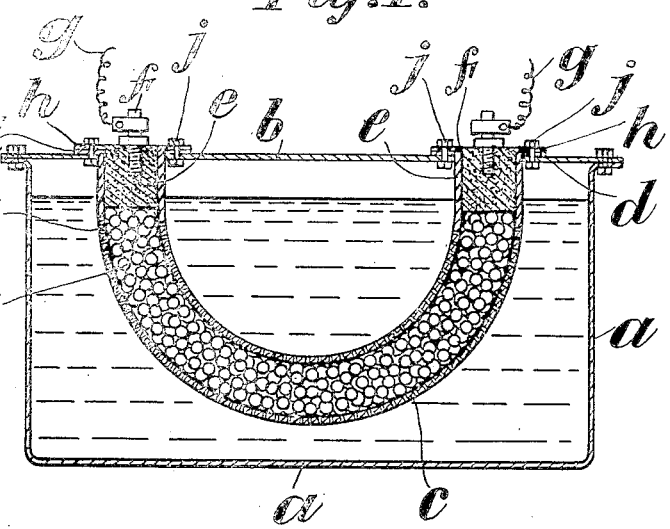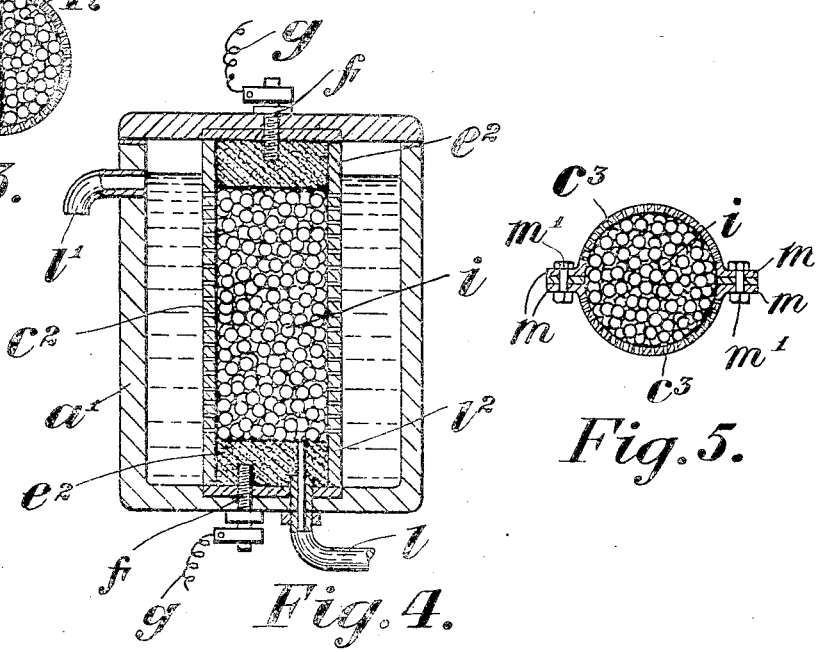

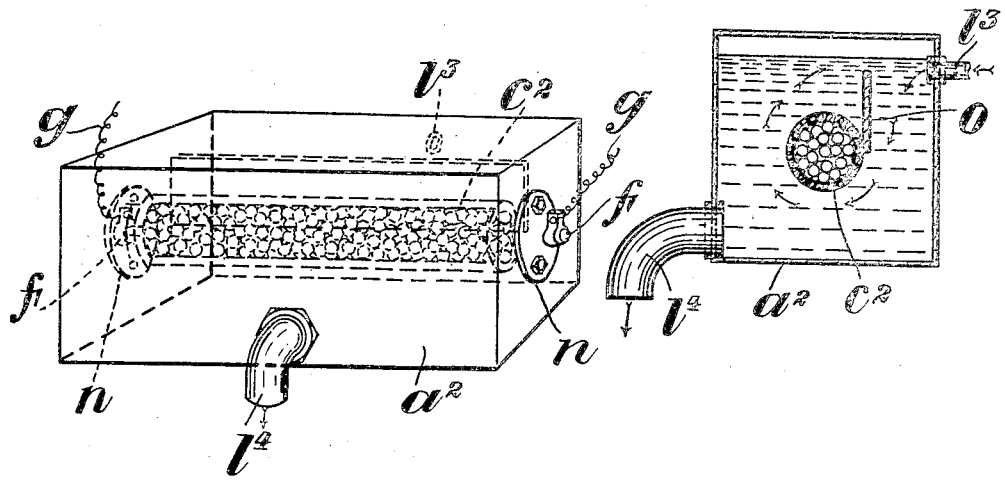
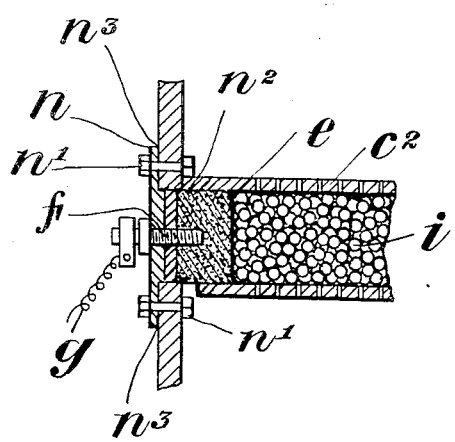
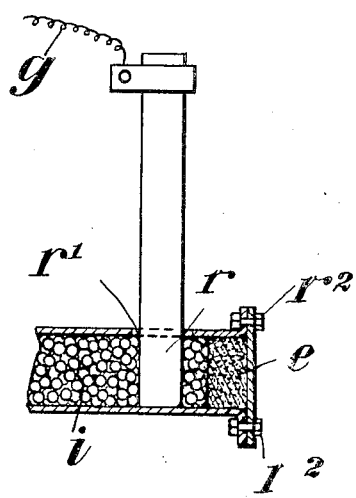

THOMAS McCLELLAND, JR., OF CATHCART, NEAR GLASGOW, SCOTLAND.

APPARATUS FOR HEATING, EVAPORATING, VOLATILIZING, OR DISTILLING LIQUIDS BY ELECTRICITY.

1,121,743.

Specification of Letters Patent.

Patented Dec. 22, 1914.

Application filed November 30, 1912. Serial No. 734,301.

*To all whom it may concern:*

Be it known that I, THOMAS McCLELLAND, Jr., a subject of the King of Great Britain, residing at Muirend, Cathcart, near Glasgow, Scotland, have invented certain new and useful Apparatus for Heating, Evaporating, Volatilizing, or Distilling Liquids by Electricity, of which the following is a specification.

This invention relates to apparatus for heating, evaporating, volatilizing or distilling liquids of the type in which the liquid is in direct contact with carbon (or other equivalent non-metallic resisting material) in the form of pieces, particles, granules or the like, and through which a current of electricity is caused to pass.

Under this invention I use one or more containers which are preferably slotted or otherwise have openings distributed all around same and may be of tubular or other shape and in which the carbon (or other non-metallic pieces, particles, granules or the like) is placed, packed, or fitted. The containers are wholly or partially immersed in the liquid and in such manner that the liquid has free access from all sides to the carbon or other particles therein. The containers (which are of glass or other suitable non-conducting material) may be made straight, curved, U, cylindrical or of other convenient formation and may be fitted, suspended, supported or otherwise held in place in the tank or vessel. The carbon granules or pieces are or may be made to contact with and be more or less compressed by insulated carbon or other pole pieces or terminal blocks which latter have the electric wires connected thereto.

In order that the invention may be clearly understood I have hereunto appended explanatory drawings, which show by way of illustration or example, several modes of carrying out the invention.

On the drawings:—Figure 1 is a longitudinal section showing one form of the apparatus. Fig. 2 is a vertical section showing another form of the container. Fig. 3 is a horizontal section of the container shown in Fig. 2, taken on the line X, X. Fig. 4 is a vertical section showing a second form of the apparatus. Fig. 5 is a horizontal section of the modified form of the container shown in Fig. 4. Fig. 6 is a perspective view showing a third form of the apparatus. Fig. 7 is a vertical cross section of the same. Fig. 8 is a detail section showing one method of fitting the terminal piece in the end of the container. Fig. 9 shows a modified form of the same.

The apparatus shown at Fig. 1 comprises a tank or vessel $a$ having a cover plate $b$ of wood, or other suitable non-conducting material, thereon, with openings therein for the reception of the upper ends of the U-shaped perforated container $c$ made of glass or other suitable non-conducting material. The container $c$ has flanges $d$ for the connection thereof to the cover plate $b$ and also has carbon or other pole pieces or terminal blocks $e$ (which may, if situated above the water level, as shown in Fig. 1, be made of metal, but, if partially immersed, are of carbon, so as to prevent oxidation). The pieces or blocks $e$ are shown with binding screws $f$ for the attachment of the leads $g$, and the blocks $e$ are provided with flanges $h$ so that they may be readily screwed down by means or bolts $j$, against the granules or the like $i$ in the container to more or less compress the same and so insure good contact. The tank or vessel is preferably provided with any suitable and well known means, such as a ball cock, to allow the liquid to flow thereinto and with any well known means to allow the liquid to be drawn off as required. In operation, the molecules of the liquid in the tank pass through the perforations in the container and between the granules thereby contacting therewith and becoming heated. The heated liquid rises and in this manner circulation is set up. This construction of the device is very suitable where a quantity of hot liquid is required from time to time, as in lavatories, etc.

The perforated container $c^1$ shown at Figs. 2 and 3 is of cylindrical form and has its bottom $c^2$ made with perforations or openings similar to those in the sides thereof, and, extending from the top of this container to within a short distance of the bottom thereof, is a central non-perforated partition plate $k$ of insulating material. The pole pieces or terminal blocks $e^1$ are of semicircular section to fit the top of the container on either side of the plate $k$ but are in other respects similar to the blocks $e$ shown at Fig. 1. The container $c^1$ is adapted to be immersed, or partially immersed, in any body of water which it may be desired to heat, being filled with granules or the like $i$ such as in the container $c$, Fig. 1.

The apparatus shown at Fig. 4 has a cylindrical tank or vessel $a^1$ fitted with a liquid inlet pipe $l$ at the bottom thereof and with an outlet pipe $l^1$ at the top thereof, and having a straight and vertically arranged container $c^2$ which is perforated and filled with granules or the like $i$ as in the case of the containers $c$ and $c^1$ above referred to. The container $c^2$ is fitted with pole pieces or terminal blocks $e^2$ having binding screws $f$ for the attachment of the leads $g$ as at Figs. 1 and 2, such screws being passed through the end of the cylindrical tank or vessel $a^1$. While the liquid outlet pipe $l^1$ communicates through the side of the tank $a^1$ with the annular liquid space the inlet pipe $l$ is screwed through the bottom of the tank $a^1$ and communicates with a passage $l^2$ in the block $e^2$ so that the liquid is supplied direct to the interior of the container $c^2$. If desired, of course, the liquid may be supplied to such annular liquid space through the pipe $l^1$ and may leave the apparatus through the passage $l^2$ and pipe $l$.

In the form of container shown at Fig. 5 a perforated and longitudinally split tube $c^3$ is provided with longitudinal flanges $m$ through which bolts $m^1$ are passed in such manner that, on said bolts $m^1$ being tightened and the two parts being drawn together, the granules or the like $i$ therebetween are forced toward the tube ends and are thereby pressed against the pole pieces or terminal blocks in such manner as to insure a good contact.

In the form of apparatus shown at Figs. 6 and 7 a rectangular tank or container $a^2$ is fitted with a tubular container $c^{2'}$ similar to that shown at Fig. 4 but having plates $n$ secured on the outer surfaces of the tank ends for retaining the container in place. Liquid may be supplied to the tank $a^2$ at the top thereof by means of an inlet pipe $l^3$ and can be drawn therefrom, as desired, by means of a larger pipe $l^4$ at the foot thereof and having a control valve. A vertical and longitudinal baffle plate $o$ is fitted in the tank $a^2$ at one side of the container, so as to cause the liquid, as it is heated, to circulate, the flow of liquid being in the direction of the arrows (Fig. 7).

In the terminal fitting shown at Fig. 8, the pole piece or block $e$ is fitted into the end of the container $c^2$ so as to compress the granules $i$ and insure a good contact and has screwed thereinto a binding screw $f$ for the attachment of the lead $g$. A washer or plate $n$ (such as shown at Fig. 6) is mounted on the screw $f$ and is adapted to be tightly screwed against the tank $a^2$ by means of the bolts $n^1$, a packing ring $n^2$ being inserted between such ring and the block $e$ and a ring $n^3$ between the same and the tank so as to prevent the escape of liquid from the tank.

In the fitting shown at Fig. 9 the block $e$ serves to compress the granules $i$ and acts through a carbon, or other terminal block or pole piece $r$ which so projects through a slot or enlarged opening $r^1$ in the container as to be capable of a slight longitudinal movement as the block $e$ is tightened up by means of its bolts $r^2$. The block or piece $r$, which extends above the level of the liquid in the tank or container, has the lead $g$ attached thereto and is held in close contact with the granules $i$ in the container.

Having now fully described my invention what I claim and desire to secure by Letters Patent is:—

1. Apparatus for heating liquids by electricity comprising, in combination, a liquid holding vessel, a perforated container fitted within said vessel and so as to be immersed in the liquid, a non-metallic resisting material in the form of carbon, small pieces of carbon packed in the container, terminal blocks in the ends of the container, means for pressing said blocks into the container so as to compress the resisting material therein and electrical connections on said blocks.

2. Apparatus for heating liquids by electricity comprising in combination, a liquid holding vessel, liquid inlet and outlet pipes thereto, a perforated container fitted within said vessel, a non-metallic resisting material in the form of small pieces packed in the container, terminal blocks in the ends of the container, electrical connections on said blocks and a deflector inserted between the fluid inlet and outlet pipes to cause the fluid to flow all around the perforated container.

In testimony whereof I affix my signature in presence of two witnesses.

THOMAS McCLELLAND, Jr.

Witnesses:
H. D. FITZPATRICK,
MARGARET FINDLAY YOUNG.